United States Patent
Song (10) Patent No.: US 11,711,441 B2
(45) Date of Patent: Jul. 25, 2023

(54) METHOD AND APPARATUS FOR PUBLISHING VIDEO SYNCHRONOUSLY, ELECTRONIC DEVICE, AND READABLE STORAGE MEDIUM

(71) Applicant: Beijing Bytedance Network Technology Co., Ltd., Beijing (CN)

(72) Inventor: Yu Song, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/420,889

(22) PCT Filed: Jan. 17, 2020

(86) PCT No.: PCT/CN2020/072832
§ 371 (c)(1),
(2) Date: Jul. 6, 2021

(87) PCT Pub. No.: WO2020/151599
PCT Pub. Date: Jul. 30, 2020

(65) Prior Publication Data
US 2022/0094758 A1 Mar. 24, 2022

(51) Int. Cl.
*H04L 67/55* (2022.01)
*G06F 3/0482* (2013.01)

(52) U.S. Cl.
CPC ............ *H04L 67/55* (2022.05); *G06F 3/0482* (2013.01)

(58) Field of Classification Search
CPC .......................... H04L 67/55; H04L 29/08072
(Continued)

(56) References Cited

U.S. PATENT DOCUMENTS 9,407,718 B2 * 8/2016 Li .......................... H04L 67/303
11,271,987 B1 * 3/2022 Diwakaran ............. H04L 67/55
(Continued)

FOREIGN PATENT DOCUMENTS

| AU | 2007221434 A1 * | 8/2008 | ......... G06F 17/3089 |
| CN | 101184112 A | 5/2008 | |

(Continued)

OTHER PUBLICATIONS

International Search Report and Written Opinion for International Application No. PCT/CN2020/072832, dated Apr. 8, 2020, 11 pages.
(Continued)

*Primary Examiner* — Khanh Q Dinh (57) ABSTRACT

Embodiments of the present invention provide a method and apparatus for publishing a video synchronously, an electronic device, and a readable storage medium. The method comprises: receiving a video publishing request by means of a first video publishing platform, wherein the video publishing request comprises a video identification, a user identification, and a video synchronization identification of a video to be published, and the video synchronization identification is used for identifying a second server corresponding to at least one second video publishing platform required to synchronously publish said video; and in response to the video publishing request, sending the video publishing request to a first server corresponding to the first video publishing platform, so that the first server sends, on the basis of the video synchronization identification, the video identification and the user identification to the second server.

9 Claims, 5 Drawing Sheets

(58) Field of Classification Search
USPC .................. 709/220, 223, 224, 225, 228
See application file for complete search history.

(56) References Cited

U.S. PATENT DOCUMENTS

| | | | |
|---|---|---|---|
| 2004/0039834 A1* | 2/2004 | Saunders | H04L 67/55 709/231 |
| 2005/0160367 A1* | 7/2005 | Sirota | G06Q 10/1095 715/752 |
| 2011/0296474 A1* | 12/2011 | Babic | H04N 21/21 725/87 |
| 2015/0180748 A1* | 6/2015 | Ding | H04L 67/00 709/224 |
| 2016/0269483 A1 | 9/2016 | Ran et al. | |
| 2016/0330258 A1* | 11/2016 | Sandhu | G06F 16/435 |
| 2017/0055136 A1 | 2/2017 | Lee et al. | |
| 2022/0171466 A1* | 6/2022 | Zhang | G06F 3/1423 |

FOREIGN PATENT DOCUMENTS

| | | |
|---|---|---|
| CN | 102790725 A | 11/2012 |
| CN | 103051646 A | 4/2013 |
| CN | 103873570 A | 6/2014 |
| CN | 105389160 A | 3/2016 |
| CN | 105898396 A | 8/2016 |
| CN | 108259318 A | 7/2018 |
| CN | 108471378 A | 8/2018 |
| CN | 109005415 A | 12/2018 |
| CN | 109769127 A | 5/2019 |

OTHER PUBLICATIONS

Chinese Patent Application No. 201910074979.X, First Office Action dated Mar. 4, 2020, 8 pages.
Chinese Patent Application No. 201910074979.X, Second Office Action dated Oct. 19, 2020, 7 pages.
Chinese Patent Application No. 201910074979.X, Final Rejection dated Mar. 24, 2021, 7 pages.

* cited by examiner

METHOD AND APPARATUS FOR PUBLISHING VIDEO SYNCHRONOUSLY, ELECTRONIC DEVICE, AND READABLE STORAGE MEDIUM

CROSS-REFERENCE TO RELATED APPLICATION

This application is a U.S. 371 Application of International Patent Application No. PCT/CN2020/072832, filed on 17 Jan. 2020, which application claims the benefit of Chinese Patent Application No. 201910074979.X, filed on Jan. 25, 2019, in China National Intellectual Property Administration, the disclosures of which are incorporated herein in their entireties by reference.

Technical Field

The present disclosure relates to the field of information processing technology. Specifically, the present disclosure relates to a method for video synchronization publishing, apparatus, electronic device, and readable storage medium.

Background Art

With the improvement of people's living standards and the rapid development of technology, terminal application programs have become an indispensable part of people's lives. In order to better satisfy people's experience and enrich people's lives, mobile social video platforms have developed rapidly. Through the mobile social video platform, the user can interact and share in the form of videos anytime and anywhere, and can learn about the news of people they follow through videos of other people (e.g., celebrities).

In the prior art, a user usually has multiple video social platforms. If a user publishes a video on one platform and wants to publish the video to other platforms, the user usually needs to log into another platform to publish the video again, for the user, the operation based on the above-mentioned video publishing form is cumbersome, resulting in a lower user experience.

SUMMARY OF THE INVENTION

The purpose of the present disclosure is to solve at least one of the above technical defects and improve the user experience. The technical solutions used in the present disclosure are as follows:

In a first aspect, the present disclosure provides a method for video synchronization publishing, which may include:

receiving a video publishing request through a first video publishing platform, wherein the video publishing request includes a video identifier of a video to be published, a user identifier, and a video synchronization identifier, and the video synchronization identifier is used to identify a second server corresponding to at least one second video publishing platform that needs to synchronously publish the video to be published;

transmitting the video publishing request to a first server corresponding to the first video publishing platform in response to the video publishing request, such that the first server transmits the video identifier and the user identifier to the second server based on the video synchronization identifier.

In the embodiment of the present disclosure, the method may further include:

receiving a video publishing platform selection instruction, wherein the video publishing platform selection instruction includes platform information of at least one second video publishing platform selected by a user;

generating a video synchronization identifier corresponding to each video publishing platform in the at least one second video publishing platform in response to the video publishing platform selection instruction.

In the embodiment of the present disclosure, receiving the video publishing platform selection instruction may include:

displaying a list of one or more video publishing platforms through a video publishing interface, the list including at least one second video publishing platform;

receiving the video publishing platform selection instruction through the video publishing interface, wherein the video publishing platform selection instruction corresponds to at least one video publishing platform in the list.

In an embodiment of the present disclosure, the list includes a video publishing platform authorized by a user for video synchronization publishing.

In a second aspect, the present disclosure provides an apparatus for video synchronization publishing, which may include:

a first video publishing request receiving module, configured to receive a video publishing request through a first video publishing platform, wherein the video publishing request includes a video identifier of a video to be published, a user identifier, and a video synchronization identifier, and the video synchronization identifier is used to identify a second server corresponding to at least one first video publishing platform that needs to synchronously publish a video to be published;

a first video publishing request transmitting module, configured to transmit a video publishing request to a first server corresponding to the first video publishing platform in response to the video publishing request, such that the first server transmits the video identifier and the user identifier to the second server based on the video synchronization identifier.

In an embodiment of the present disclosure, the apparatus may further include:

a synchronization identifier generation module, configured to: receive a video publishing platform selection instruction, wherein the video publishing platform selection instruction includes platform information of at least one second video publishing platform selected by the user; and generate a video synchronization identifier corresponding to each video publishing platform in the at least one second video publishing platform in response to the video publishing platform selection instruction.

In an embodiment of the present disclosure, when the synchronization identifier generation module receives the video publishing platform selection instruction, it may be further configured to:

display a list of selectable video publishing platforms through the video publishing interface, wherein the list includes at least one second video publishing platform;

receive a video publishing platform selection instruction through the video publishing interface.

In an embodiment of the present disclosure, the list may include video publishing platforms authorized by the user for video synchronization publishing.

In a third aspect, the present disclosure also provides a method for video synchronization publishing, which may include:

receiving a video publishing request, wherein the video publishing request includes a video identifier of a video to be published and a user identifier; and in a case that the video publishing request includes a video synchronization identifier, transmitting the video identifier and the user identifier to the server corresponding to the video synchronization identifier, such that the server may save the video identifier in a first video list corresponding to the user identifier, wherein the video synchronization identifier is used to identify a server corresponding to at least one video publishing platform that needs to synchronously publish the video to be published.

In an embodiment of the present disclosure, after receiving the video publishing request, the method may further comprise:

saving the video identifier in the second video information list corresponding to the user identifier.

In a fourth aspect, the present disclosure also provides an apparatus for video synchronization publishing, which may include:

a second video publishing request receiving module, configured to receive a video publishing request, wherein the video publishing request includes a video identifier of a video to be published and a user identifier; and a video publishing request processing module, configured to transmit the video identifier and the user identifier to the second server corresponding to the video synchronization identifier in the case that the video publishing request includes the video synchronization identifier, such that the second server saves the video identifier in a second video list corresponding to the user identifier, wherein the video synchronization identifier is used to characterize the server corresponding to at least one video publishing platform that needs to synchronously publish the video to be published.

In an embodiment of the present disclosure, the video publishing request processing module may be further configured to:

after receiving the video publishing request, store the video identifier in the first video information list corresponding to the user identifier.

In a fifth aspect, the present disclosure provides an electronic device including a processor and a memory; wherein the memory may be configured to store computer operation instructions;

the processor may be configured to execute the method shown in any embodiment of the first aspect or any embodiment of the third aspect of the present disclosure by invoking the computer operation instructions.

In a sixth aspect, the present disclosure provides a computer-readable storage medium, the computer-readable storage medium stores computer programs, the storage medium stores at least one instruction, at least one program, a code set or an instruction set, the at least one instruction, at least one program, the code set, or the instruction set is loaded and executed by a processor to implement the method shown in any embodiment of the first aspect or any embodiment of the third aspect of the present disclosure.

The beneficial effects brought about by the technical solutions provided by the embodiments of the present disclosure are:

in embodiments of the present disclosure, when a user publishes a video on a video publishing platform, if the video needs to be synchronously published on other platforms, based on the method of the embodiment of the present disclosure, it may transmit the publishing request containing the video identifier, the user identifier and the video synchronization identifier to the first server, wherein the video synchronization identifier identifies the second server corresponding to the video publishing platform, such that the first server can determine the second server corresponding to the video publishing platform that needs to synchronously publish the video to be published based on the video synchronization identifier, and transmit the user identifier and the video identifier to the corresponding second server, such that the second server saves the video identifier in the video list corresponding to the user identifier after receiving the user identifier and the video identifier, such that the synchronous publication of the video on the video publishing platform corresponding to the first server and the video publishing platform corresponding to the second server is achieved. Therefore, when a user logs into the video publishing platform corresponding to the second server, the second server may transmit the video to the corresponding video publishing platform, such that the user can see the synchronously published video. As can be seen, through the solution of the embodiment of the present disclosure, the user only needs to transmit a video publishing request once to publish the video to different video publishing platforms. Obviously, it is not necessary to enter different video publishing platforms and publish the video in different video publishing platforms respectively when publishing the same video to different video publishing platforms in the prior art. The embodiments of the present disclosure simplify the process of synchronously publishing videos, improves the user's operating experience, and better meets the actual application needs.

THE DESCRIPTION OF DRAWINGS

In order to illustrate the technical solutions more clearly in the embodiments of the present disclosure, the following may briefly introduce the drawings that need to be used in the description of the embodiments of the present disclosure.

DETAILED DESCRIPTION OF THE PREFERRED EMBODIMENT

Embodiments of the present invention may be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

The technical solutions of the present disclosure and how the technical solutions of the present disclosure solve the above technical problems are described in detail below with specific embodiments. The following specific embodiments can be combined with each other, and the same or similar concepts or processes may not be repeated in some embodiments. The embodiments of the present disclosure may be described below in conjunction with the accompanying drawings.

Figure 1:
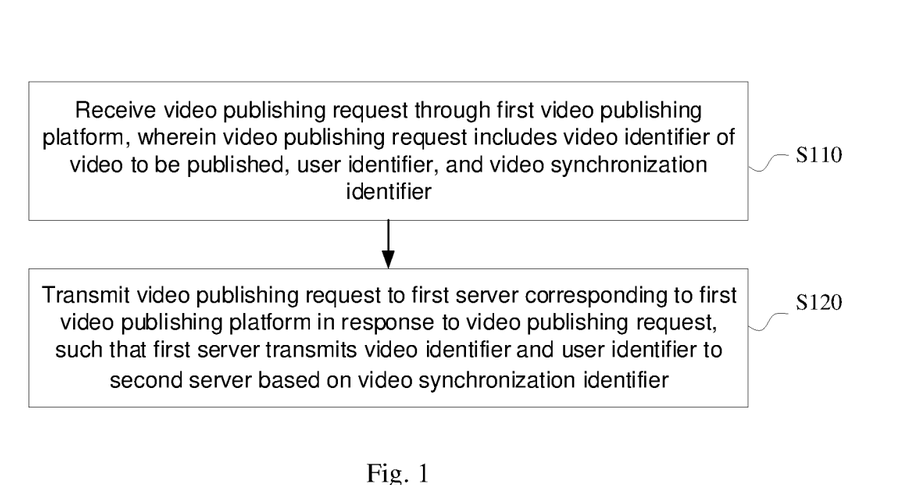
FIG. 1 is a schematic flowchart of a method for video synchronization publishing in an embodiment of the present disclosure.

The embodiments of the present disclosure provide a method for video synchronization publishing. As shown in FIG. 1, the method may include:

Step S110: receiving a video publishing request through a first video publishing platform, wherein the video publishing request includes a video identifier of a video to be published, a user identifier, and a video synchronization identifier, and the video synchronization identifier is used to identify a second server corresponding to at least one second video publishing platform that needs to synchronously publish the video to be published; and Step S120: transmitting the video publishing request to a first server corresponding to the first video publishing platform in response to the video publishing request, such that the first server transmits the video identifier and the user identifier to the second server based on the video synchronization identifier.

In the embodiment of the present disclosure, when a user publishes a video on a video publishing platform, if the video needs to be synchronously published on other platforms, based on the method of the embodiment of the present disclosure, it may transmit the publishing request containing the video identifier, the user identifier and the video synchronization identifier to the first server, wherein the video synchronization identifier identifies the second server corresponding to the video publishing platform, such that the first server can determine the second server corresponding to the video publishing platform that needs to synchronously publish the video to be published based on the video synchronization identifier, and transmit the user identifier and the video identifier to the corresponding second server, such that the second server saves the video identifier in the video list corresponding to the user identifier after receiving the user identifier and the video identifier, such that the synchronous publication of the video on the video publishing platform corresponding to the first server and the video publishing platform corresponding to the second server is achieved. Therefore, when a user logs into the video publishing platform corresponding to the second server, the second server may transmit the video to the corresponding video publishing platform, such that the user can see the video published synchronously. As can be seen, through the solution of the embodiment of the present disclosure, the user only needs to transmit a video publishing request once to publish the video to different video publishing platforms. Obviously, it is not necessary to enter different video publishing platforms and publish the video in different video publishing platforms when publishing the same video to different video publishing platforms in the prior art. The embodiments of the present disclosure simplify the process of synchronously publishing videos, improves the user's operating experience, and better meets the actual application needs.

The following describes in detail a method for video synchronization publishing provided by embodiments of the present disclosure.

In step S110, a video publishing request is received through a first video publishing platform, wherein the video publishing request includes a video identifier of a video to be published, a user identifier, and a video synchronization identifier, and the video synchronization identifier is used to identify a second server corresponding to at least one second video publishing platform that needs to synchronously publish the video to be published.

Wherein, the first video publishing platform and the second video publishing platform are different video publishing platforms. The first video publishing platform refers to the video publishing platform that currently transmits the video publishing request, and a backend server corresponding to the first video publishing platform is the first server, the second video publishing platform refers to the video platform that needs to synchronously publish the video to be published, and a backend server corresponding to the second video publishing platform is the second server; in actual applications, the each second video publishing platform may correspond to a backend server, the each backend server may correspond to one video synchronization identifier, and based on the video synchronization identifier, the backend server corresponding to the second video publishing platform (that is, the second server,) can be found.

In an example, the video to be published is synchronously published to three different video publishing platforms, such as video publishing platform A, video publishing platform B, and video publishing platform C. The backend server of video publishing platform A corresponds to a video synchronization identifier a. The backend server of video publishing platform B corresponds to a video synchronization identifier b. The backend server of video publishing platform C corresponds to a video synchronization identifier c. At this time, the video publishing request may include these three video synchronization identifiers; based on the video synchronization identifiers, the backend server corresponding to the video publishing platform can be determined. For example, based on the video synchronization identifier c, the backend server corresponding to the video publishing platform C can be determined.

Wherein, the video publishing request refers to an instruction that the user wants to publish the currently recorded video or locally stored video to different video publishing platforms. The video publishing request may include the video identifier of the video to be published, the user identifier, and the video synchronization identifier. The video identifier of the video to be published is used to uniquely identify a video. In other words, the video to be published can be determined based on the video identifier. The user identifier is used to uniquely identify an account information. In the embodiment of the present disclosure, when a user wants to publish a video to be published to the same user's account in different video publishing platforms, the video publishing request can carry the user identifier, and the video list corresponding to the user in different video publishing platforms can be found based on the user identifier.

In the embodiment of the present disclosure, the method further includes:

receiving a video publishing platform selection instruction, wherein the video publishing platform selection instruction includes platform information of at least one selected second video publishing platform; and generating a video synchronization identifier corresponding to each video publishing platform in the at least one second video publishing platform in response to the video publishing platform selection instruction.

In actual applications, before the user publishes the video to be published, the user can also select the specific video publishing platforms on which the user wants to publish the video. In other word, the user may also receive the user's video publishing platform selection instruction. The instruction may include the platform information of the video publishing platform selected by the user, and further, in response to the video publishing platform selection instruction, a video synchronization identifier corresponding to each selected video publishing platform is generated.

Wherein the manner of generating the video synchronization identifier corresponding to each video publishing platform is not limited in the embodiment of the present disclosure. In an example, the mapping table between the video publishing platforms that the user can select and the corresponding video synchronization identifiers can be pre-configured, and after receiving the video publishing platform selection instruction transmitted by the user, according to the platform information of the at least one second video publishing platform selected by the user and the mapping table, the video synchronization identifier corresponding to each second video publishing platform in the at least one second video publishing platforms selected by the user can be determined.

In the embodiment of the present disclosure, receiving a video publishing platform selection instruction may include:

displaying a list of one or more video publishing platforms through a video publishing interface, and the list includes at least one second video publishing platform;

receiving a video publishing platform selection instruction through the video publishing interface.

Wherein, the one or more video publishing platforms may be selectable, which refers to the video publishing platforms that the user can select to synchronously publish videos, and the one or more video publishing platforms can be displayed in the form of a list on the video publishing interface, and the second video publishing platform refers to the video platform that needs to synchronously publish the video to be published, that is, the at least one second video publishing platform selected by the user is selected based on the video publishing platforms available in the list. In an optional implementation, the video publishing platform selection instruction corresponds to at least one video publishing platform in the list.

In actual applications, in order to enable the user to better know the video publishing platforms that can perform video synchronization publishing, the platform information of the available video publishing platforms can be displayed in the list, and the list can be displayed on the video publishing interface. In this way, the user selects a video publishing platform that needs to synchronously publish videos based on the platform information of at least one video publishing platform displayed in the video publishing interface.

Wherein, the platform information of the video publishing platform is used to indicate which video publishing platform is, such that the user can select which video publishing platforms need to synchronously publish the video based on the platform information. Wherein, the specific display form of platform information is not limited in the embodiments of the present disclosure. For example, it may be the platform name of the video publishing platform, or the picture identifier of the video publishing platform, or other information that can identify the video publishing platform.

Figure 2A:
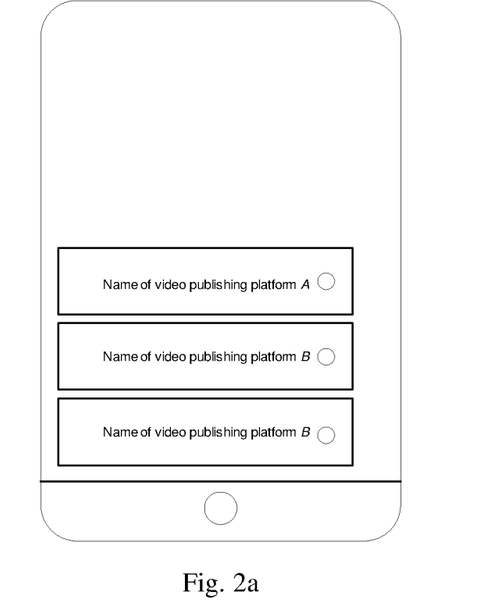
FIG. 2a is a schematic diagram of a video publishing interface in an embodiment of the present disclosure.
Figure 2B:
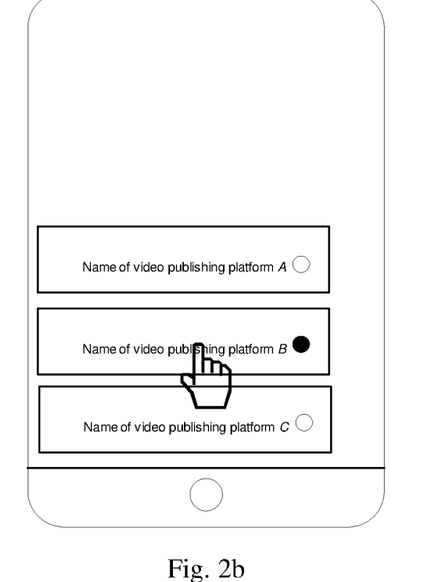
FIG. 2b is a schematic diagram of another video publishing interface in an embodiment of the present disclosure.

As shown in FIG. 2a, an embodiment of the present disclosure provides an optional video publishing interface. It can be seen from the figure that the video publishing interface of this example displays platform information of three video publishing platforms that the user can select, such as the name of the video publishing platform A, the name of the video publishing platform B, and the name of the video publishing platform C. At this time, none of the three video publishing platforms are the video publishing platform selected by the user that need to synchronously publish videos, thus the display identifier which is used to identify whether the video publishing platform is the video platform needs to synchronously publish videos selected by the user is in a grey state (as shown by the unfilled black circle in FIG. 2a). When the user selects the video publishing platform that needs to synchronously publish videos based on the video publishing interface, for example, the video publishing platform selected by the user for video synchronization publishing is video publishing platform B. At this time, the video publishing platform selection instruction may include the platform information of video publishing platform B, and the display identifier of the video publishing platform B is in a light up state (as shown by the filled black circle in FIG. 2b) to inform the user that the video publishing platform B has been selected as the video publishing platform for video synchronization publishing.

It should be noted that in actual applications, the platform information of the video publishing platform displayed in the video publishing interface can also be the platform information of the video publishing platform where the user wants to synchronously publish the video. When the user clicks the video publishing each time, the video is synchronously published to these video publishing platforms, that is, the video synchronization identifiers corresponding to these video publishing platforms are transmitted to the first server. Of course, when this method is adopted, the user can also perform the corresponding selection operation on the user interface. At this time, the user selection operation corresponds to the video publishing platform where the user does not want to synchronously publish the video.

Figure 2C:
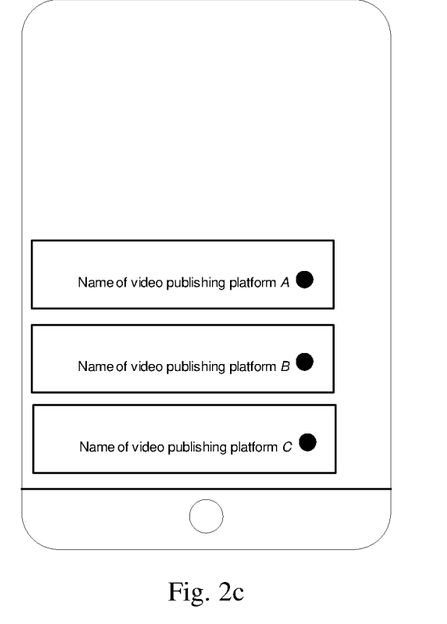
FIG. 2c is a schematic diagram of yet another video publishing interface in an embodiment of the present disclosure.
Figure 2D:
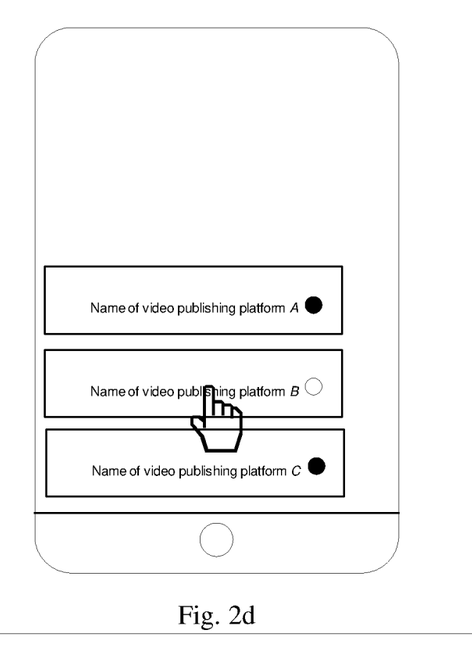
FIG. 2d is a schematic diagram of another video publishing interface in an embodiment of the present disclosure.

The three video publishing platforms displayed on the video publishing interface shown in FIG. 2c are all pre-configured as the video publishing platforms on which the user wants to synchronously publish videos. At this time, the display identifiers of the three video publishing platforms are all set to a light up state (as shown in FIG. 2c, the circle behind the name of the video publishing platform A, the name of the video publishing platform B, and the name of the video publishing platform C displayed in the video publishing interface are filled with black). If the user performs a selection operation on the platform information of one of the video publishing platforms before publishing the video, the user's operation at this time indicates that the user does not want to use the video publishing platform as a video publishing platform for synchronously publishing videos. After the terminal receives this operation, the remaining video publishing platform may be used as the video publishing platform for synchronously publishing videos, and the display identifier of the video publishing platform may be set to a gray state (as shown in FIG. 2d, the circle behind the name of the video publishing platform B is no longer filled with black).

In the embodiment of the present disclosure, the list includes a video publishing platform authorized by the user for video synchronization publishing.

In actual applications, the user can preconfigure video publishing platforms that can publish video synchronously according to their actual needs. For example, the user can be provided with a list of video publishing platforms that can publish videos synchronously. The user can select the platform where the user wants to publish videos synchronously from the list, display the platform information of the video publishing platform selected by the user that can synchronously publish videos in the video publishing interface in the form of a list based on the user's selection. When the user publishes a video to be published each time, the user can select the video platform that needs to publish videos synchronously based on the platform information of the video publishing platform included in the list.

In step S120, a video publishing request is transmitted to a first server corresponding to the first video publishing platform in response to the video publishing request, such that the first server transmits the video identifier and the user identifier to the second server based on the video synchronization identifier.

Wherein, the first server is the backend server corresponding to the first video publishing platform that transmit the video publishing request. If the video publishing request is transmitted in the video publishing platform A, the first server is the backend server corresponding to the video publishing platform A.

In other words, after receiving the video publishing request, the terminal device can transmit the video publishing request to the first server; after receiving the video publishing request, the first server can transmit the video identifier and the user identifier to the second server corresponding to the video synchronization identifier based on the video synchronization identifier; after receiving the video identifier and the user identifier, the second server can determine the video information list corresponding to the user identifier according to the user identifier, wherein the video information list includes all the user's video information in the corresponding video publishing platform, and then save the video identifier of the video to be published in the video information list corresponding to the user identifier, and display the information about the synchronously published video in the user's video information list in the corresponding video publishing platform, such that when the user logs into the corresponding video publishing platform next time, the user can find the synchronously published video in the video information list. When receiving an instruction from the user to view the synchronously published video, the corresponding video can be obtained from the corresponding storage server based on the saved video identifier. Wherein, the storage server may be set in the first server, or may be a separately set storage server for storing published videos.

Figure 3:
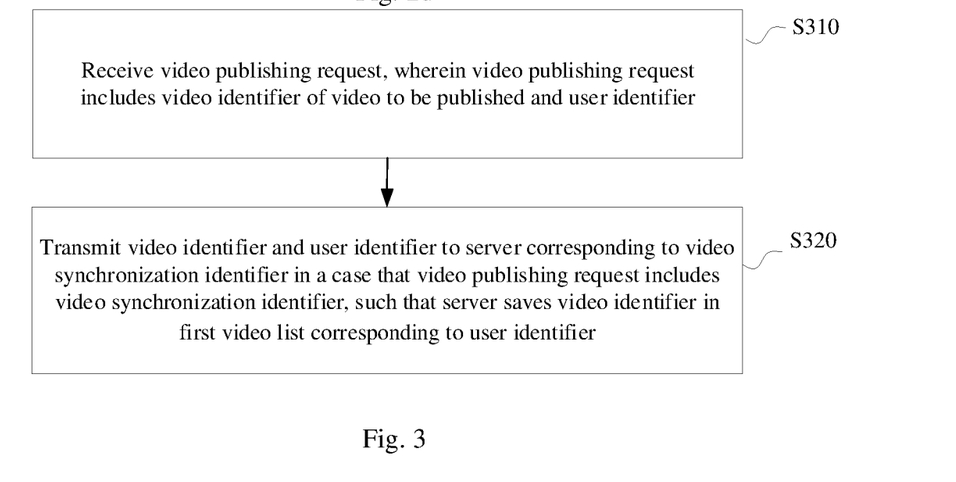
FIG. 3 is a schematic flowchart of another method for video synchronization publishing in an embodiment of the present disclosure.

The embodiment of the present disclosure also provides a method for video synchronization publishing. As shown in FIG. 3, the method may include:

Step S310: receiving a video publishing request, wherein the video publishing request includes a video identifier of the video to be published and a user identifier; and Step S320: transmitting the video identifier and the user identifier to a server corresponding to the video synchronization identifier in the case that the video publishing request includes a video synchronization identifier, such that the server saves the video identifier in a first video list corresponding to the user identifier, wherein the video synchronization identifier is used to characterize a server corresponding to at least one video publishing platform needs to synchronously publish.

In the embodiment of the present disclosure, when a user publishes a video on a video publishing platform, if the video needs to be synchronously published on other platforms, based on the method of the embodiment of the present disclosure, when the user logs into the video publishing platform corresponding to the server, the user can see the synchronously published video. As can be seen, in the solution of the embodiment of the present disclosure, the user only needs to transmit the video publishing request once to publish the video to different video publishing platforms. Obviously, it is not necessary to publish the same video to different videos publishing platforms as in the prior art, and it is necessary to enter different video publishing platforms separately, and then republish in different video publishing platforms, which simplifies the process of synchronously publishing videos and improves the user experience.

The following describes in detail another method for video synchronization publishing provided by an embodiment of the present disclosure.

In step S310, a video publishing request is received, wherein the video publishing request includes a video identifier of the video to be published and a user identifier.

Wherein, the backend server corresponding to the current video publishing platform that transmits the video publishing request receives the video publishing request, that is, the above first server.

In the embodiment of the present disclosure, the method further includes: after receiving the video publishing request, storing the video identifier in a second video information list corresponding to the user identifier.

In other words, after receiving the video request, the backend server corresponding to the current video publishing platform may determine the second video information list corresponding to the user identifier wherein the second video information list includes all the user's video information in the current video publishing platform, then save the video identifier of the video to be published in the second video information list corresponding to the user identifier, and display the information about the synchronously published video in the user's video information list in the current video publishing platform, such that when the user logs into the current video publishing platform, the synchronously published video can be found in the video information list. When the user's instruction to view the synchronously published video is received, the corresponding video can be obtained from the corresponding storage server based on the saved video identifier. Wherein, the storage server may be set in the first server, or may be a separately set storage server for storing published videos.

In step S320, the video identifier and the user identifier are transmitted to the server corresponding to the video synchronization identifier in the case that the video publishing request includes the video synchronization identifier, such that the server saves the video identifier in the first video list corresponding to the user identifier, wherein, the video synchronization identifier is used to characterize the server corresponding to at least one video publishing platform that needs to synchronously publish.

In other words, after the backend server corresponding to the current video publishing platform receives the video publishing request, it also needs to determine whether the video request also includes a video synchronization identifier, wherein the video synchronization identifier is used to characterize the backend server corresponding to at least one video publishing platform that needs to synchronously publish the video to be published, that is, the backend server corresponding to at least one video publishing platform that needs to synchronously publish the video to be published (that is, the above second server) can be determined according to the video synchronization identifier.

In the case that the video publishing request also includes the video synchronization identifier, it is necessary to determine the server corresponding to at least one video publishing platform that publishes the video to be published according to the video synchronization identifier. After the server corresponding to the video publishing platform is determined, the video identifier and the user identifier in the publishing request are transmitted to the server corresponding to the video synchronization identifier. Wherein, the method of determining the server corresponding to the video synchronization identifier is not limited in the embodiment of the present disclosure.

In an example, the mapping table between the server and the corresponding video synchronization identifier may be configured in advance. When the video synchronization identifier is also included in the video publishing request, according to the mapping table between the server and the corresponding video synchronization identifier, the server corresponding to the video synchronization identifier included in the video publishing request is determined.

Further, after the server corresponding to the video synchronization identifier receives the video identifier and the user identifier, the method can determine the first video list corresponding to the user identifier according to the user identifier, and then save the video identifier in the first video list corresponding to the user identifier, wherein the first list includes all the user's video information in the corresponding video publishing platform, and display the information about the synchronously published video in the user's video information list in the corresponding video publishing platform, such that when the user logs into the corresponding video publishing platform, the method can find the synchronously published video in the video information list of the corresponding video publishing platform. When receiving a viewing instruction from the user to view the synchronous published video, the synchronously published video is obtained from the corresponding storage server based on the saved video identifier of the synchronously published video.

Wherein, when the storage server for storing the synchronously published video is set in the first server, the synchronously published video may be obtained from the storage server in the first server; when the storage server for storing the synchronously published video is a separately set storage server for publishing the video, the synchronously published video may be obtained from the storage server for storing the published video at this time.

In an example, the user wants to synchronously transmit the video to the video publishing platform B and the video publishing platform C on the video publishing platform A, after the terminal device receives the video publishing request transmitted by the user, the terminal device then transmits the user's user identifier and the video identifier and the video synchronization identifier of video publishing platform B and the video synchronization identifier of video publishing platform C to the server corresponding to video publishing platform A. After the server corresponding to video publishing platform A receives the video publishing request, it may store the video identifier in the video list corresponding to the user identifier in the video publishing platform A, determine the backend servers corresponding to the video publishing platform B and the video publishing platform C according to the video synchronization identifiers of the video publishing platform B and the video publishing platform C, and transmit the user's user identifier, the video identifier to the backend servers corresponding to the video publishing platform B and the video publishing platform C. After the backend servers corresponding to the video publishing platform B and the video publishing platform C receive the user identifier and the video identifier, the backend servers determine the video list of the user identifier in the respective video publishing platform, and respectively stores the video identifiers in the video list corresponding to the user identifier in the corresponding video publishing platform. In this way, when the user logs into the video publishing platform B or the video publishing platform C next time, the user can find the video information corresponding to the video identifier in the video information list in the video publishing platform B or the video publishing platform C. When the user's view instruction of viewing the video corresponding to the video identifier is received, the corresponding video can be obtained from the corresponding storage server based on the saved video identifier.

Figure 4:
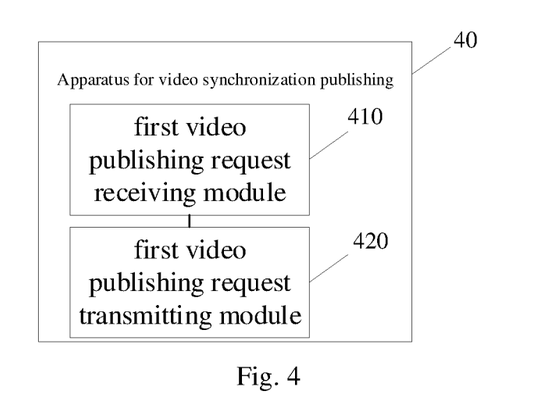
FIG. 4 is a schematic structural diagram of an apparatus for video synchronization publishing in an embodiment of the present disclosure.

Based on the same principle as the method shown in FIG. 1, an embodiment of the present disclosure provides an apparatus for video synchronization publishing 40. As shown in FIG. 4, the apparatus 40 may include: a first video publishing request receiving module 410 and a first video publishing request transmitting module 420, in which, the first video publishing request receiving module 410 is configured to receive a video publishing request through a first video publishing platform, wherein the video publishing request includes a video identifier of a video to be published, a user identifier, and a video synchronization identifier, and the video synchronization identifier is used to identify a second server corresponding to at least one second video publishing platform that needs to synchronously publish the video to be published;

the first video publishing request transmitting module 420 is configured to transmit a video publishing request to a first server corresponding to the first video publishing platform in response to the video publishing request, such that the first server transmits the video identifier and the user identifier to a second server based on the video synchronization identifier.

In the embodiment of the present disclosure, the apparatus may further include:

a synchronization identifier generation module, which is configured to: receive a video publishing platform selection instruction, wherein the video publishing platform selection instruction includes platform information of at least one second video publishing platform selected by a user; and generate at least one video synchronization identifier corresponding to each video publishing platform in the second video publishing platform in response to the video publishing platform selection instruction.

In the embodiment of the present disclosure, when the synchronization identifier generation module receives the video publishing platform selection instruction, it may be further configured to:

display a list of selectable video publishing platforms through a video publishing interface, wherein the list includes at least one second video publishing platform;

receive the video publishing platform selection instruction through the video publishing interface.

In the embodiment of the present disclosure, the list may include a video publishing platform authorized by the user for video synchronization publishing.

Figure 5:
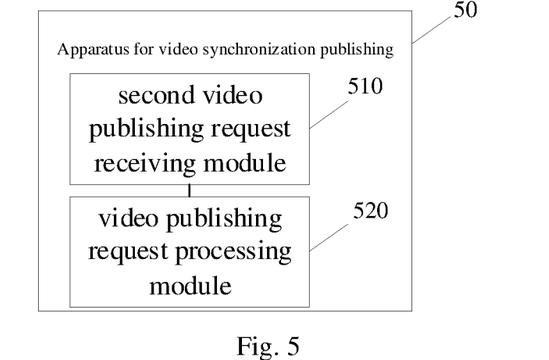
FIG. 5 is a schematic structural diagram of another apparatus for video synchronization publishing in an embodiment of the present disclosure.

Based on the same principle as the method shown in FIG. 3, an embodiment of the present disclosure also provides an apparatus for video synchronization publishing 50. As shown in FIG. 5, the apparatus 50 may include: a second video publishing request receiving module 510 and a video publishing request processing module 520, wherein the second video publishing request receiving module 510 is configured to receive a video publishing request, wherein the video publishing request includes a video identifier of a video to be published and a user identifier;

the video publishing request processing module 520 is configured to transmit the video identifier and the user identifier to a second server corresponding to a video synchronization identifier in the cases that the video publishing request includes the video synchronization identifier, such that a second server saves a second video list corresponding to the user identifier, wherein the video synchronization identifier is used to characterize the server corresponding to at least one video publishing platform that needs to synchronously publish the video to be published.

In the embodiment of the present disclosure, the video publishing request processing module may be further configured to:

store the video identifier in the first video information list corresponding to the user identifier after receiving the video publishing request.

The apparatus for video synchronization publishing of the embodiments of the present disclosure can execute the method for video synchronization publishing provided by the embodiments of the present disclosure, and they have the similar implementation principles. The actions performed by each module in the apparatus for video synchronization publishing in the embodiments of the present disclosure corresponds to the steps in the method for video synchronization publishing in each embodiment of the present disclosure. For the detailed function description of each module of the apparatus for video synchronization publishing, please refer to the description in the corresponding method for video synchronization publishing shown in the preceding text, and may not be repeated here.

Based on the same principle as the method for video synchronization publishing in the embodiment of the present disclosure, the embodiment of the present disclosure also provides an electronic device. The electronic device may include, but is not limited to: a processor and a memory; the memory may be configured to store computer operation instructions; the processor may be configured to execute the method shown in the embodiments by invoking the computer operation instructions.

Based on the same principle as the method for video synchronization publishing in the embodiments of the present disclosure, the embodiments of the present disclosure also provide a computer-readable storage medium, wherein the computer-readable storage medium stores a computer program, and the storage medium stores at least one instruction, at least one program, a code set or an instruction set, the at least one instruction, the at least one program, the code set or the instruction set is loaded and executed by the processor to implement the method shown in the above embodiments, which may not be repeated here.

Figure 6:
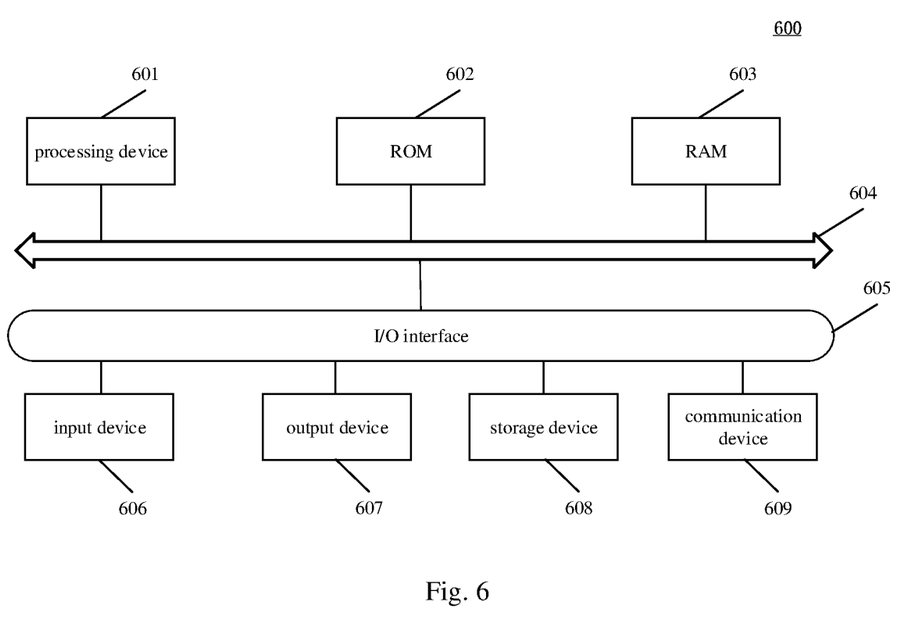
FIG. 6 is a schematic structural diagram of an electronic device provided by an embodiment of the disclosure.

Reference is now made to following FIG. 6, the solution of the embodiment of the disclosure illustrates a schematic structural diagram of an electronic device 600 suitable for implementing the embodiments of the present application. The electronic device 600 can be a terminal device or a server. Wherein, the terminal device may include, but is not limited to, a mobile terminal (such as a mobile phone, a notebook computer, a digital broadcast receiver, a PDA (Personal Digital Assistant), a PAD (Tablet Computer), a PMP (Portable Multimedia Player), vehicle terminal (such as car navigation terminals) etc.) and fixed terminals (such as digital TVs, desktop computers, etc.). The electronic device shown in FIG. 6 is only an example, and should not impose any limitation on the functions and scope of use of the embodiments of the present application.

As shown in FIG. 6, the electronic device 600 may include a processing device (such as a central processing unit, a graphics processor, etc.) 601, which may perform various appropriate actions and processes according to programs stored in a read-only memory (ROM) 602 or programs loaded from the storage device 608 into a random access memory (RAM) 603. In the RAM 603, various programs and data necessary for the operations of the electronic device 600 are also stored. The processing device 601, the ROM 602, and the RAM 603 are connected to each other through a bus 604. An input/output (I/O) interface 605 is also connected to the bus 604.

Generally, the following devices can be connected to the I/O interface 605: including an input device 606 such as a touch screen, touch pad, keyboard, mouse, camera, microphone, accelerometer, gyroscope; an output device 607 including, for example, liquid crystal display (LCD), speakers, vibrator; a storage device 608 including, for example, a magnetic tape, a hard disk; and a communication device 609. The communication device 609 may allow the electronic device 600 to perform wireless or wired communication with other devices to exchange data. Although FIG. 6 shows the electronic device 600 having various devices, it should be understood that it is not required to implement or have all the devices shown. Alternatively, it can implement or have more or less devices.

In particular, the processes described above with reference to the flowcharts may be implemented as a computer software program according to an embodiment of the present disclosure. For example, an embodiment of the present disclosure includes a computer program product including a computer program loaded on a computer readable medium, and the computer program contains program codes for executing the method shown in the flowchart. In such an embodiment, the computer program may be downloaded and installed from the network via the communication device 609, or installed from the storage device 608, or installed from the ROM 602. When the computer program is executed by the processing device 601, the above functions defined in the method of the embodiments of the present disclosure are executed.

It should be noted that the above computer readable medium of the present disclosure may be a computer readable signal medium or a computer readable storage medium or any combination of the above two. The computer readable storage medium may be, for example, but is not limited to, an electronic, magnetic, optical, electromagnetic, infrared, or semiconductor system, apparatus, or device, or any combination of the above. More specific examples of the computer readable storage media may include, but are not limited to, electrical connections having one or more wires, portable computer disks, hard disks, random access memory (RAM), read only memory (ROM), erasable programmable read only memory (EPROM or flash memory), optical fiber, portable compact disk read only memory (CD-ROM), optical storage device, magnetic storage device, or any suitable combination of the above. In the present disclosure, a computer readable storage medium may be any tangible medium that may contain or store programs, which may be used by or in connection with an instruction execution system, apparatus, or device. In the present disclosure, a computer readable signal medium may include a data signal that is propagated in the baseband or propagated as part of a carrier, carrying computer readable program codes. Such propagated data signals may take various forms, which includes, but is not limited to, electromagnetic signals, optical signals, or any suitable combination of the above. The computer readable signal medium may also be any computer readable medium except for a computer readable storage medium, and the computer readable signal medium may transmit, propagate, or transport a program for use by or in connection with an instruction execution system, apparatus, or device. Program codes contained on the computer readable medium may be transmitted by any suitable medium, which includes but is not limited to: wire, fiber optic cable, RF (radio frequency), and the like, or any suitable combination of the above.

The above computer readable medium may be contained in the above electronic device; or may be separately present and is not incorporated in the electronic device.

The computer readable medium carries one or more programs, when the one or more programs are executed by the electronic device, causing the electronic device to execute the method shown in the above embodiment.

Computer program codes for executing the operations of the present disclosure may be written in one or more programming languages, or combinations thereof, wherein the programming languages includes an object-oriented programming language such as Java, Smalltalk, C++, and also includes conventional procedural programming language— such as "C" language or similar programming languages. The program codes may be executed entirely on the user's computer, partly executed on the user's computer, executed as an independent software package, partly executed on the user's computer and partly executed on the remote computer, or entirely executed on the remote computer or on the server. In the case of involving the remote computer, the remote computer may be connected to the user's computer through any kind of network, including a local area network (LAN) or a wide area network (WAN), or may be connected to an external computer (e.g., using an Internet service provider to connect via Internet).

The flowchart and block diagrams in the drawings illustrate the architecture, function, and operation of possible implementations of systems, methods, and computer program products according to various embodiments of the present disclosure. In this regard, each block of the flowchart or block diagram may represent one module, a program segment, or a portion of the codes, and the module, the program segment, or the portion of codes includes one or more executable instructions for implementing the specified logic functions. It should also be noted that in some alternative implementations, the functions noted in the blocks may also occur in an order different from the order noted in the drawings. For example, two successively represented blocks may in fact be executed substantially in parallel, and they may sometimes be executed in the opposite order, depending upon the involved function. It is also noted that each block of the block diagrams and/or flowcharts, and combinations of blocks in the block diagrams and/or flowcharts, may be implemented in a dedicated hardware-based system that executes the specified functions or operations, or it may be implemented by a combination of dedicated hardware and computer instructions.

The units involved in the embodiments described in the present disclosure may be implemented in a software manner, and may also be implemented in a hardware manner Wherein, the name of the unit does not constitute a limitation on the unit itself under certain circumstances. For example, the first obtaining unit can also be described as "a unit for obtaining at least two Internet Protocol addresses".

The above description is only a preferred embodiment of the present disclosure and a description of the principles of the applied technology. It should be understood by those skilled in the art that the disclosure scope of the present disclosure is not limited to the specific technical solutions of the above technical features, and should also cover other technical solutions formed by the random combination of the above technical features or equivalent features thereof without departing from the above disclosed concept, such as a technique solution in which the above features are replaced with technical features having similar functions disclosed (but is not limited) in the present disclosure.

What is claimed is:

1. A method for video synchronization publishing, comprising:

receiving a video publishing request through a first video publishing platform, wherein the video publishing request includes a video identifier of a video to be published, a user identifier, and a video synchronization identifier, wherein the video identifier is used to obtain the video to be published from a storage server, the video synchronization identifier is used to identify a second server corresponding to at least one second video publishing platform for synchronously publishing the video;

transmitting the video publishing request to a first server corresponding to the first video publishing platform in response to the video publishing request, such that the first server saves the video identifier in a second video information list corresponding to the user identifier, and transmits the video identifier and the user identifier to the second server based on the video synchronization identifier such that the second server saves the video identifier in a first video information list corresponding to the user identifier;

receiving a video publishing platform selection instruction, wherein the video publishing platform selection instruction includes platform information of the at least one second video publishing platform selected by a user; and generating a video synchronization identifier corresponding to each video publishing platform in the at least one second video publishing platform in response to the video publishing platform selection instruction, wherein receiving the video publishing platform selection instruction further comprises:

displaying a list of one or more video publishing platforms through a video publishing interface, wherein the list includes the at least one second video publishing platform; and receiving the video publishing platform selection instruction through the video publishing interface, wherein the video publishing platform selection instruction corresponds to at least one video publishing platform in the list.

2. The method according to claim 1, wherein the list includes a video publishing platform authorized by the user for video synchronization publishing.

3. A method for video synchronization publishing comprising:

receiving a video publishing request, wherein the video publishing request includes a video identifier of a video to be published and a user identifier;

saving the video identifier in a second video information list corresponding to the user identifier, wherein the video identifier is used to obtain the video to be published from a storage server;

when the video publishing request includes a video synchronization identifier, transmitting the video identifier and the user identifier to a server corresponding to the video synchronization identifier, such that the server corresponding to the video synchronization identifier saves the video identifier in a first video list corresponding to the user identifier, wherein the video synchronization identifier is used to identify a server corresponding to at least one video publishing platform for synchronously publishing the video receiving a video publishing platform selection instruction, wherein the video publishing platform selection instruction includes platform information of the at least one second video publishing platform selected by a user; and generating a video synchronization identifier corresponding to each video publishing platform in the at least one second video publishing platform in response to the video publishing platform selection instruction, wherein receiving the video publishing platform selection instruction further comprises:

displaying a list of one or more video publishing platforms through a video publishing interface, wherein the list includes the at least one second video publishing platform; and receiving the video publishing platform selection instruction through the video publishing interface, wherein the video publishing platform selection instruction corresponds to at least one video publishing platform in the list.

4. The method according to claim 3, wherein the second video information list includes all the user's video information in the current video publishing platform.

5. An electronic device, comprising:
a memory; and
a processor, wherein the memory is configured to store computer operation instructions that, when executed by the processor, cause the electronic device to:

receive a video publishing request through a first video publishing platform, wherein the video publishing request includes a video identifier of a video to be published, a user identifier, and a video synchronization identifier, wherein the video identifier is used to obtain the video to be published from a storage server, the video synchronization identifier is used to identify a second server corresponding to at least one second video publishing platform for synchronously publishing the video;

transmit the video publishing request to a first server corresponding to the first video publishing platform in response to the video publishing request, such that the first server saves the video identifier in a second video information list corresponding to the user identifier, and transmits the video identifier and the user identifier to the second server based on the video synchronization identifier such that the second server saves the video identifier in a first video information list corresponding to the user identifier;

receive a video publishing platform selection instruction, wherein the video publishing platform selection instruction includes platform information of the at least one second video publishing platform selected by a user; and generate a video synchronization identifier corresponding to each video publishing platform in the at least one second video publishing platform in response to the video publishing platform selection instruction, wherein receiving the video publishing platform selection instruction further comprises:

displaying a list of one or more video publishing platforms through a video publishing interface, wherein the list includes the at least one second video publishing platform; and receiving the video publishing platform selection instruction through the video publishing interface, wherein the video publishing platform selection instruction corresponds to at least one video publishing platform in the list.

6. A non-transitory computer-readable storage medium, wherein the computer-readable storage medium stores computer programs, and the storage medium stores at least one instruction, at least one program, and a code set or an instruction set for implementing the method of claim 1.

7. An electronic device, comprising:
a processor; and
a memory, wherein the memory is configured to store computer operation instructions that, when executed by the processor, cause the electronic device to:

receive a video publishing request, wherein the video publishing request includes a video identifier of a video to be published and a user identifier;

save the video identifier in a second video information list corresponding to the user identifier, wherein the video identifier is used to obtain the video to be published from a storage server;

when the video publishing request includes a video synchronization identifier, transmit the video identifier and the user identifier to a server corresponding to the video synchronization identifier, such that the server corresponding to the video synchronization identifier saves the video identifier in a first video list corresponding to the user identifier, wherein the video synchronization identifier is used to identify a server corresponding to at least one video publishing platform for synchronously publishing the video;

receive a video publishing platform selection instruction, wherein the video publishing platform selection instruction includes platform information of the at least one second video publishing platform selected by a user; and generate a video synchronization identifier corresponding to each video publishing platform in the at least one second video publishing platform in response to the video publishing platform selection instruction, wherein receiving the video publishing platform selection instruction further comprises:
- displaying a list of one or more video publishing platforms through a video publishing interface, wherein the list includes the at least one second video publishing platform; and
- receiving the video publishing platform selection instruction through the video publishing interface, wherein the video publishing platform selection instruction corresponds to at least one video publishing platform in the list.

8. A non-transitory computer-readable storage medium, wherein the computer-readable storage medium stores computer programs, and the storage medium stores at least one instruction, at least one program, and a code set or an instruction set for implementing the method of claim 3.

9. The method according to claim 1, wherein the second video information list includes all the user's video information in the current video publishing platform.

\* \* \* \* \*

UNITED STATES PATENT AND TRADEMARK OFFICE
CERTIFICATE OF CORRECTION

| | | |
|---|---|---|
| PATENT NO. | : 11,711,441 B2 | Page 1 of 1 |
| APPLICATION NO. | : 17/420889 | |
| DATED | : July 25, 2023 | |
| INVENTOR(S) | : Yu Song | |

It is certified that error appears in the above-identified patent and that said Letters Patent is hereby corrected as shown below:

On the Title Page

Add Item (30) "Foreign Application Priority Data":
Jan. 25, 2019 (CN) ................. 201910074979.X Signed and Sealed this
Tenth Day of October, 2023

Katherine Kelly Vidal
*Director of the United States Patent and Trademark Office*